United States Patent Office 3,462,180
Patented Aug. 19, 1969

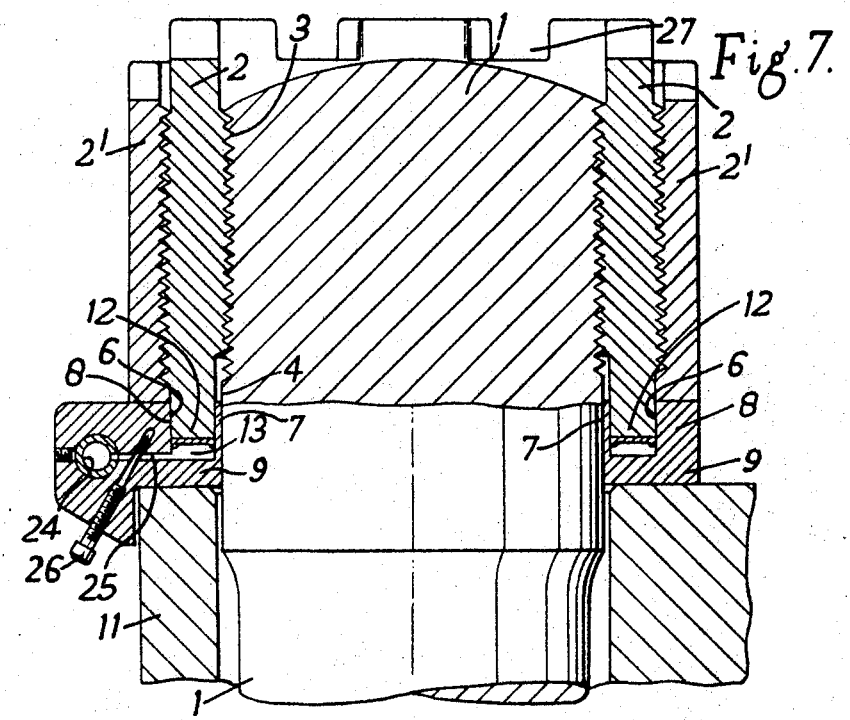
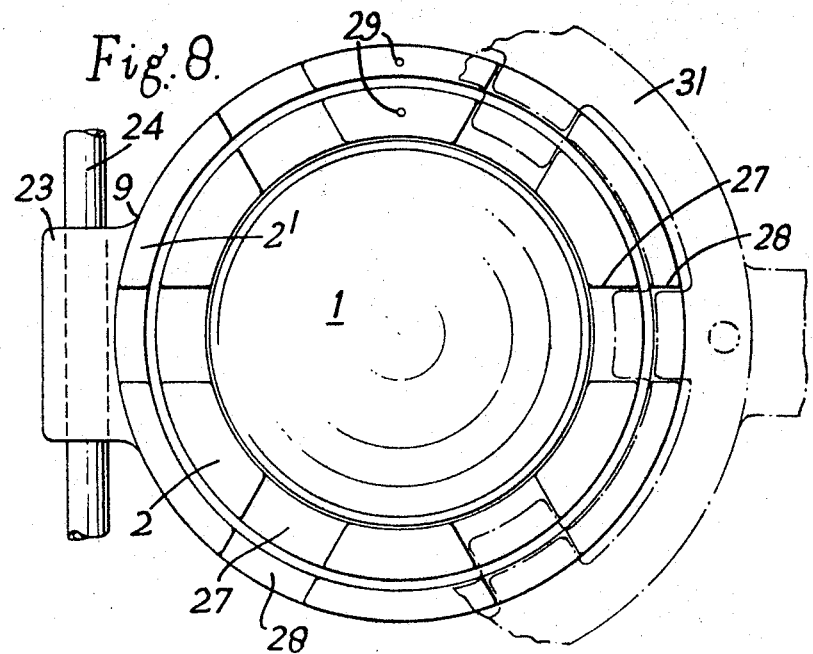

3,462,180
TENSIONING OF BOLTS, STUDS AND LIKE SCREW-THREADED MEMBERS
Thomas W. Bunyan, London, England, assignor to P & O Pilgrim Valve Limited, London, England
Filed Dec. 29, 1966, Ser. No. 605,812
Claims priority, application Great Britain, Jan. 11, 1966, 1,191/66
Int. Cl. F16b 1/00, 7/00
U.S. Cl. 287—189.36                    11 Claims

ABSTRACT OF THE DISCLOSURE

A nut or bolt with an annular channel below the nut or bolt head closed by an axially slidable annular piston, and constituting an annular pressure chamber in which pressure is applied to move the nut or bolt head by reaction against the piston to tension the bolt or other shank on which the nut has been screwed. One or both walls of the channel slide externally against smooth close-fitting surfaces to ensure support against transverse force components in the chamber. The pressure distributing medium in the chamber may consist of a putty-like material.

---

The present invention is concerned with the tensioning of bolts, studs and like screw-threaded members retained under tension by nuts applied on the threaded members.

Various arrangements are known for tensioning and elongating fixing bolts and studs and more particularly fixing bolts and studs of large size, and including ships propeller shafts, which make use of an annular pressure chamber between a nut applied on the bolt or the head of the bolt itself and the assembly being bolted, the closed pressure chamber being defined by surfaces of parts which can be moved relative to one another in the direction axially of the bolt or stud by application of pressure in the closed chamber to expand the chamber axially and exert axially directed pressure on the nut or the bolt head to apply tension to the bolt or stud without imparting relative rotation between the bolt or stud and the nut during the tensioning operation, and the present invention relates to tensioning arrangements of this kind.

In many bolted assemblies the number and pitching or spacing of the bolts and the high bolt stress to be employed gives rise to the problem of providing sufficient spacing for convenient preliminary location and manipulation of nuts adequate to maintain the required tension in the bolts and the subsequent execution of the tensioning operation.

It is amongst the objects of the present invention to provide an improved arrangement enabling the overall circumferential dimensions of the nuts to be kept low.

The application of pressure in the annular pressure chamber has sometimes been by the introduction of pressure liquid such as oil or grease through an inlet to the chamber by means of a pressure grease gun or equivalent pressure source, but this of course is dependent on the availability of such a pressure source.

Other known arrangements make use of an annular mass of rubber or like solid yielding and substantially incompressible material filling the annular closed space, separate isolated areas of the surface of the mass being subjected to deforming pressure by means of screws movable in threaded apertures extending through the wall of the nut whereby the maximum axial thickness of the parts of the mass between those isolated areas is increased to expand the chamber and move the nut axially, to tension the bolt.

In accordance with the invention there is provided a bolt, stud or like member screw-threaded over a part of its length and having a part adjacent said screw-threaded part of a diameter not less than the maximum diameter of the screw-threaded part and a nut for retaining engagement with the screw-threaded part, an annular pressure chamber being defined beneath the lower end of the nut by surfaces of parts including the nut itself capable of relative movement in the direction axially of the nut, one of said parts containing an annular channel and the other embodying an annular piston-like part which is a sliding fit in said annular channel, the external surface of the radially inner wall of the annular channel making continuous surface contact with the surface of the said unthreaded part of the bolt, stud or the like, in the assembled condition of the nut and bolt, stud or the like.

With this arrangement the inner wall of the channel in the channelled member is supported by its engagement with the smooth unthreaded part of the bolt or stud against deformation by transverse components of pressure when the tensioning pressure is applied in the pressure chamber and this enables very thin channel walls, with consequent reduction in the radial dimension of the channelled part, to be employed.

It is desirable to avoid lost motion during the operation of tensioning since the available degree of stretching of the bolts during tensioning is limited and it is desirable that maximum tensioning pressure in the chamber be achieved in early stages of the operation.

Where the pressure medium in the pressure chamber is rubber or rubber-like material an aim is that the mass of material introduced into the channel shall make close continuous surface contact with the walls of the chamber in the unstressed condition of the mass, but this state is often difficult and time consuming to achieve due primarily to the extremely wide tolerances in the industrial production of rings and tubes in materials of the nature of rubber.

In accordance with a further feature of the invention the deformable material employed in the pressure chamber comprises a putty-like plastic substantially inelastic and substantially incompressible particulate mass. Such a material can be readily packed into the annular channel-forming part of the closed pressure chamber in such a manner as to fill the channel to the required extent prior to the closure of the chamber by insertion of the piston-like part. As examples may be mentioned glaziers putty, consisting primarily of a mixture of whiting and linseed oil, and the material known under the trade name of Plasticene, graphite paste formed of finely divided graphite mixed with oil or other appropriate liquid to form a manipulable plastic paste. In some cases such putty-like materials may be used in conjunction with a ring of rubber or like material in order to pack any gaps between the unstressed ring and the walls of the pressure chamber.

Where the bolted assemblies and therefore the bolts and nuts are to be subjected to heat, the putty-like plastic, inelastic incompressible particulate material of the mass may comprise mixtures including powdered ceramic or other refractory materials with a liquid binder to provide a manipulatable plastic mass.

In many cases, after tensioning, the tensioned condition is maintained by the introduction of accurately dimensioned shims, in the form of split-rings, into the gap produced beneath the nut or bolt head, after which the pressure in the pressure chamber can be relieved so that the shims are effectively retained by engagement of the nuts.

When the assembly is to be subjected to heat the mixture used in the pressure chamber may be such as to become calcined after an interval and in such case the tension can be maintained in the bolt or stud solely by the material in the pressure chamber, or by that material in conjunction with shims introduced under the nut or bolt head with some small degree of pressure relief prior to calcination.

Where the pressure in the pressure chamber is applied by the introduction of a grease or other liquid medium the pressure chamber may be formed in part in a separate ring structure applied over the bolt or stud beneath the nut and this arrangement is of particular utility in cases where a number of close pitched bolts or studs are required to be tensioned to a predetermined similar extent, e.g. as in the case of a cylinder head or pipe flange, since the separate ring structure of the several bolts or studs may be connected by a conduit common to all leading the pressure grease from a single source to the pressure chambers of all the bolts or studs simultaneously.

Several embodiments of the invention are illustrated by way of examples in the accompanying drawings, in which:

FIG. 7 is a view in sectional elevation of a part of a bolt as an alternative to that of FIGS. 5 and 6 and with a main nut and an auxiliary nut applied thereto;

FIG. 8 is a plan view of FIG. 7;

Figure 1:
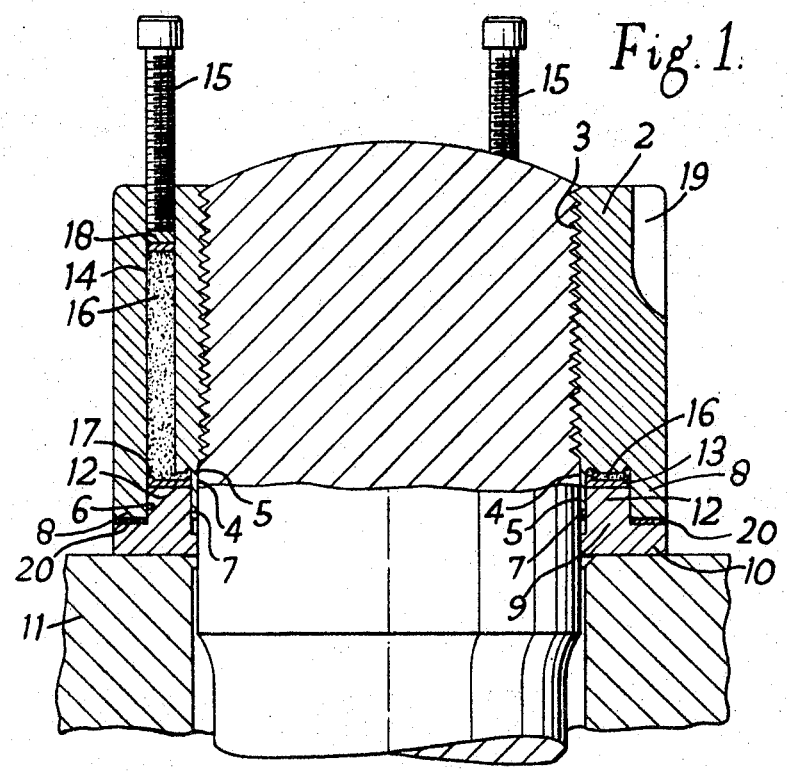
FIG. 1 is a view in sectional elevation of a part of a bolt with a nut applied.
Figure 2:
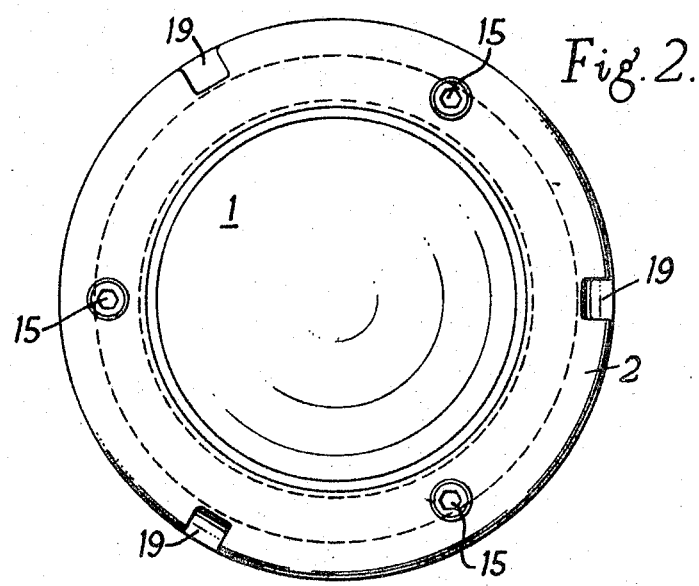
FIG. 2 is a plan view of FIG. 1.

Referring to FIGS. 1 and 2, 1 is a bolt and 2 a nut. The bolt 1 is screw-threaded at its end as indicated at 3 over a length corresponding to a part only, though a major part, of the length of the nut 2 to be received thereon, and the part 4 of the bolt adjacent the threaded part 3 is maintained at the full diameter corresponding to the maximum diameter of the threaded part 3.

The inner or lower end of the interior of the nut 2 is bored out smooth as indicated at 5 to a diameter corresponding to that of the part 4 of the bolt, and over an axial length terminating so that when the nut 2 is fully mounted on the bolt, the whole or the major part of the axially inner surface of the bored out part 5 of the nut is in continuous surface contact with the smooth unthreaded part 4 of the surface of the bolt.

An annular channel 6 concentric with the nut is formed in the inner end of the nut, of a depth terminating short of the junction of the threaded part of the nut and the bored out end part 5 thereof, and with the side walls of the channel of different thickness, the radially inner wall 7 being thinner than the radially outer wall 8, and the radially inner surface of the inner wall 7 being in continuous surface contact with the smooth surface of the large diameter part 4 of the bolt.

Surrounding the bolt 1 below the nut 2 and in sliding engagement with the bolt 1 is a ring 9 having a base portion 10 of similar radial dimensions to the nut, the flat under-face of which lies in engagement with the surface of the assembly 11 to be clamped. On the upper side of the ring 9 is formed a parallel sided annular projection 12 forming a piston-like element which is a close sliding fit in the annular channel 6.

The interior of the channel 6 and the piston-like element 12 define the closed annular pressure chamber 13 at the underside of the nut 2.

Three holes 14 equally distributed about the axis of the nut, extend from the upper end of the nut to the annular channel 6, the upper ends of the holes being threaded for the reception of screws 15.

The closed pressure chamber 13 and the parts of the holes 14 below the screws 15 are packed with a solid yielding substantially incompressible material such as rubber or a putty-like plastic substantially inelastic particulate material 16, in some instances with the interposition of an anti-extrusion sealing ring washer 17 of nylon or a soft metal such as aluminum between the mass of material 16 and the surface of the piston-like element 12, and a solid metal close-fitting sliding plug 18 against the ends of the screws 15.

In operation, with the bolt 1 applied in position, the ring 9, and the anti-extrusion ring washer 17 if used, are applied over the bolt end and the pre-packed nut 2 screwed on to the bolt end, the nut is nipped up in a conventional manner, e.g. by the application of a spanner in notches 19 provided in the nut to hold the ring 9 in contact with the assembly 11. The screws 15 are now turned to force yielding material 16 from the holes 14 under pressure into the annular pressure chamber 13 so that the latter is expanded axially with relative movement between the channel 6 and the piston-like element 12. The bolt 1 is thus tensioned and elongated without the need for rotation of the nut on the bolt during the tensioning operation.

Extension of the tensioned bolt results in the formation of a gap, as shown at 20, between the ring 9 and the underside of the nut 2, and an accurately dimensioned split washer is introduced into the gap to maintain the required tension in the bolt when the pressure in the pressure chamber 13 is relieved by slacking off the screws 15.

The transverse force or loop stress components exerted on the walls of the channel 6 are high but with the inner wall 7 of the channel continuously supported by engagement with the smooth surface of the unthreaded part 4 of the bolt the use of a thin inner wall 7 is made possible, in conjunction with an external wall 8 thick enough to withstand such transverse force components alone. The depth of the channel 6 is also preferably selected in accordance with the anticipated circumstances of use, so that the axial length of the pressure chamber remains within limits such as to avoid excessive loop stress.

Bolts and nuts as described above can be removed by manipulation of the screws 15 to reintroduce pressure into the pressure chamber 13 to elongate the bolt whereupon the split ring washer 20 can be removed, pressure relieved and the nut screwed from the bolt. After repacking such nuts and bolts may be used again.

Figure 3:
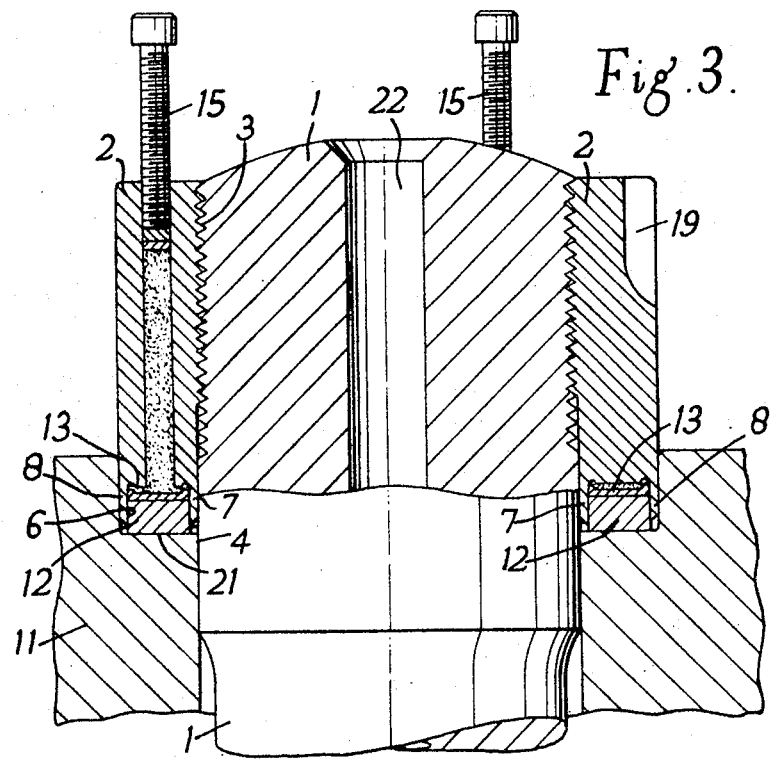
FIGS. 3 and 4 are figures generally similar to FIGS. 1 and 2 showing an alternative.
Figure 4:
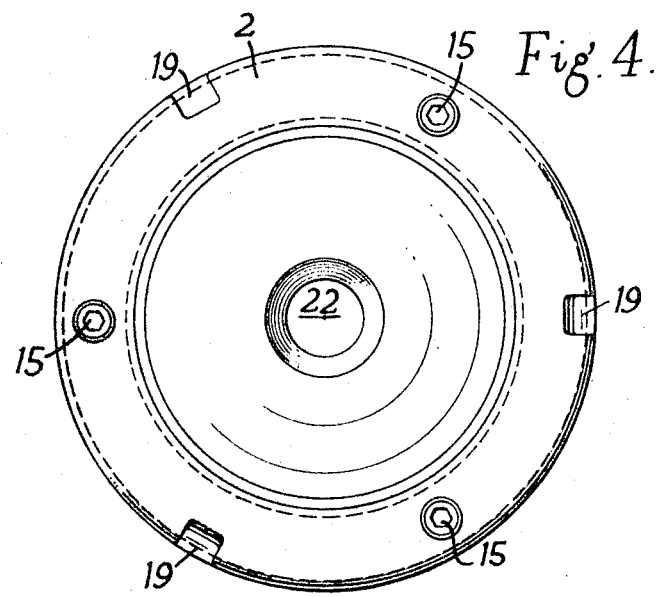

In FIGS. 3 and 4 there is illustrated an arrangement generally similar to that of FIGS. 1 and 2 but enabling a further reduction in the overall diameter of the nut 2 to be achieved.

In this embodiment the nut 2 is externally circular at least at its lower end and the aperture in the assembly 11 to be bolted is counterbored as indicated at 21 to a size such that the lower end of the nut 2 is an accurate fit within it. The closed pressure chamber 13 is formed by a concentric annular channel 6 formed in the lower end of the nut 2 and a piston-element 12 in the form of a ring of rectangular section seating on the bottom of the counterbore 21 and which is a sliding fit in the annular channel 6.

In this case both the inner wall 7 and the outer wall 8 of the annular channel are supported externally, one by engagement with the smooth unthreaded part 4 of the bolt 1 and the other by engagement with the circumferential surface of the counterbore 21.

With the construction of FIGS. 3 and 4, since it is not possible to introduce split washer shims below the nut after tensioning, the tension in the bolt is maintained by the pressure medium introduced into the pressure chamber 13. In this instance therefore it is preferable to use a putty-like inelastic particulate pressure medium capable of taking a set, e.g. by calcination.

Where such a nut and bolt is required to be freed, it would not be possible to re-apply pressure in the pressure chamber 13 but recourse can be had to the well known procedure of providing an axial bore hole 22 in the bolt 1 into which can be introduced an elongated electrical resistance heated member (not shown) to effect rapid heating of the bolt and its elongation by thermal expansion so that the nut 2 can then be screwed off from the bolt.

Figure 5:
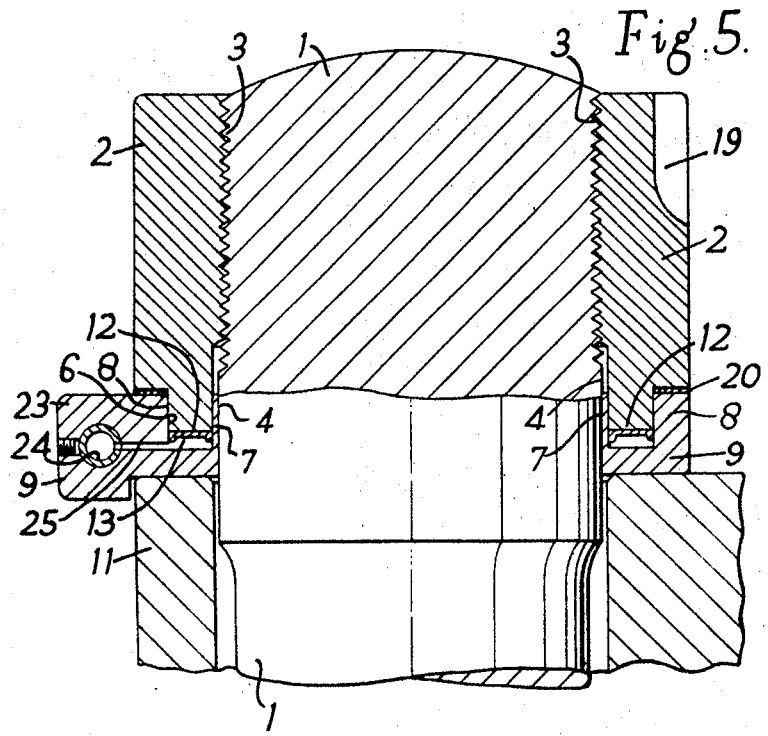
FIG. 5 is a view in sectional elevation of a part of a bolt and an arrangement directed to enabling a number of bolts to be similarly and simultaneously tensioned.
Figure 6:
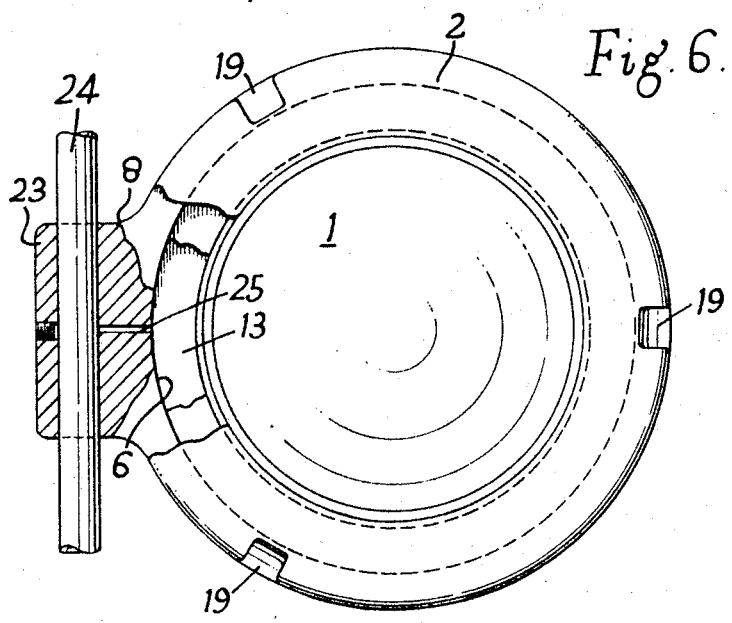
FIG. 6 is a plan view of FIG. 5.

In FIGS. 5 and 6 there is shown a construction generally similar to that of FIGS. 1 and 2, the channel 6 forming part of the closed pressure chamber 13 in this case being formed in a ring 9 applied over the bolt beneath the nut, by a channel concentric with, but closer to the inner than to the outer periphery of the ring 9, so that the inner wall 7 is thinner than the outer wall 8, the internal diameter of the inner wall again being the same as the diameter of the unthreaded part 4 of the bolt.

The piston element 12 engaged in the channel 6 is formed by a reduced annular portion at the lower end of the nut 2 itself.

The ring 9 is formed with a boss 23 extending radially outwards and bored for the reception of a pipe 24 welded or brazed in the boss 23, the interior of the pipe being in communication by way of a passage 25 with the closed pressure chamber 13 so that a fluid pressure medium may be introduced from a suitable external source by way of the pipe 24 to expand the pressure chamber 13 as in the previously described examples to tension the bolt 1.

The pipe 24 may be connected with the rings 9 of a number of bolts so that all the bolts of a group may be tensioned simultaneously and to the same tension, such an arrangement being of particular utility in cases such as bolted cylinder heads or pipe flanges.

In this case the tensioned condition of the bolt is maintained by the introduction of shims or split washers 20 of accurately determined thickness into the gap produced, in this case between the lower end of the nut 2 and the ring 9, by the pressure tensioning operation after which the pressure in the closed pressure chamber 13 may be relieved.

Figure 9:
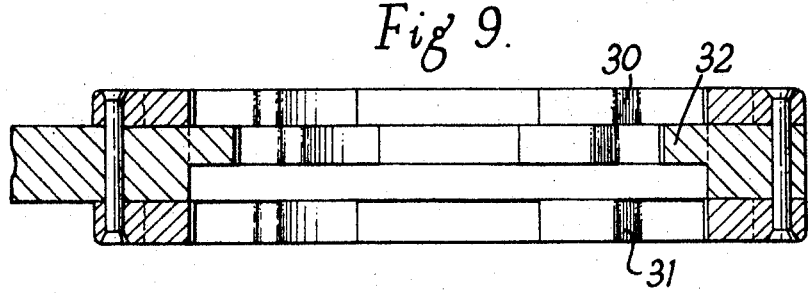
FIG. 9 is a view in section of an auxiliary spanner facilitating preliminary and final adjustments.

FIGS. 7, 8 and 9 illustrate a construction generally similar to that of FIGS. 5 and 6 but wherein a generally thinner walled main nut 2 is used on the bolt in conjunction with a secondary nut 2' screwed on to the main nut 2 and providing transverse reinforcement of the main nut and adjustable axially of the main nut to function as a tension-maintaining means for the bolt after the pressure tensioning operation has been executed.

Again, the closed pressure chamber 13 is formed between a ring 9 applied over the bolt below the nut 2 and containing an annular channel 6 with a thin inner wall 7 and a thicker outer wall 8, the internal diameter of the ring 9 being the same as the diameter of the unthreaded part 4 of the bolt 1, and the channel 6 in the ring 9 receiving the reduced and fitting annular end of the main nut 2, constituting the annular piston element 12.

Means such as a pipe 24 as in the previously described construction, may be provided for the introduction by way of a passage 25 of a fluid pressure medium to the chamber 13 to effect tensioning, and an adjustable needle or like shut off valve 26, FIG. 7, may be provided to isolate the chamber 13 from the pipe 24, so that pressure can be maintained in the chamber after pressure in the pipe is cut off, or alternatively where the pipe is connected to the pressure chambers of a number of bolts to be subjected to different tensions the pressure supply to selected bolts may be cut off whilst pressure tensioning of others is continued.

The secondary nut 2' is internally screw-threaded throughout substantially its whole length for screwed engagement with the exterior of the main nut 2, and is ground off square at its lower end so as to be capable of continuous surface engagement with the upper face of the ring 9 outside the channel 6.

The power tensioning operation is carried out by expanding the pressure chamber 13 as before, the secondary nut 2' previously applied on the main nut 2 until engaged with the ring 9, rising from the ring as tensioning proceeds. On completion of tensioning of the bolt the secondary nut 2' is screwed down into firm engagement with the ring 9, so that pressure in the pressure chamber 13 may now be relieved and tension will be maintained in the bolt.

For convenience of operation, especially under conditions of restricted space, a construction as shown in FIGS. 7, 8 and 9, is particularly advantageous.

In this construction the upper edges of the inner main and outer secondary nuts 2 and 2' are provided with sets of segmental cut outs 27 and 28 of similar number, depth and angular distribution about the axis of the nuts.

With the nuts applied to the bolt, the outer secondary nut 2', which is of a predetermined length related to that of the main nut 2, is positioned on the main nut 2 so that the upper edge of the secondary nut 2' is level with the bottom of the cut outs 27 on the main nut 2 as shown in FIG. 7 this relative position being determined by observation of registration marks 29, FIG. 8, a preliminary adjustment of the inner main and outer secondary nuts 2 and 2' in unison is made prior to the bolt tensioning operation and a final adjustment of the outer secondary nut 2' alone, following completion of the tensioning operation, to bring the outer secondary nut 2' into firm contact with the surface of the ring member 9 to maintain the tension in the bolt 1.

In FIG. 9 there is illustrated diagrammatically a form of composite C spanner whereby these preliminary and final operations may be carried out. The composite C spanner shown consists of two notched outer members 30 and 31 of a size for engagement with the cut-outs 28 of the secondary outer nut 2' and an intermediate notched member 32 of a size for engagement with the cut-outs 27 of the main inner nut 2, the three members 30, 31 and 32 being assembled as a rigid whole with the intermediate notched member 32 close to one of the outer notched members 30 and well spaced from the other outer notched member 31.

With the bolt 1, ring member 9 and inner main and outer secondary nuts 2 and 2' assembled and mounted as described above, the spanner of FIG. 9 is inverted and the two close adjacent notched members 30, 32 applied to the cut-outs 27 and 28 of the inner and outer nuts 2 and 2', and the latter screwed down in unison on the bolt 1 until the outer nut 2' makes firm engagement with the upper surface of the ring member 9.

In this position the reduced end 12 of the main nut 2 is engaged in the annular channel 6 in the ring member 9. The dimensions are selected so that the axial length of the pressure chamber 13 in the annular channel formed between the thin inner wall 7 of the ring 9 supported by the smooth part of the external face of the bolt 1, the thicker outer wall 8 of the ring and the lower face of the reduced end of the inner main nut 2 in this position is small.

Pressure medium is now introduced into the pressure chamber 13 to expand the latter axially by raising the nuts to elongate and tension the bolt, the lower end of the outer secondary nut 2' moving away, usually by a few thousandths of an inch, from the surface of the ring 9. With the pressure maintained the C spanner is applied with the other outer notched member 31 engaged with the cut-outs 28 of the outer secondary nut 2'. The spacing of the notched members 31 and 32 enables the outer secondary nut 2' to be screwed down on the main inner nut 2 and returned into firm engagement with the surface of the ring 9 so that the tension in the bolt is thereafter maintained.

Figure 10:
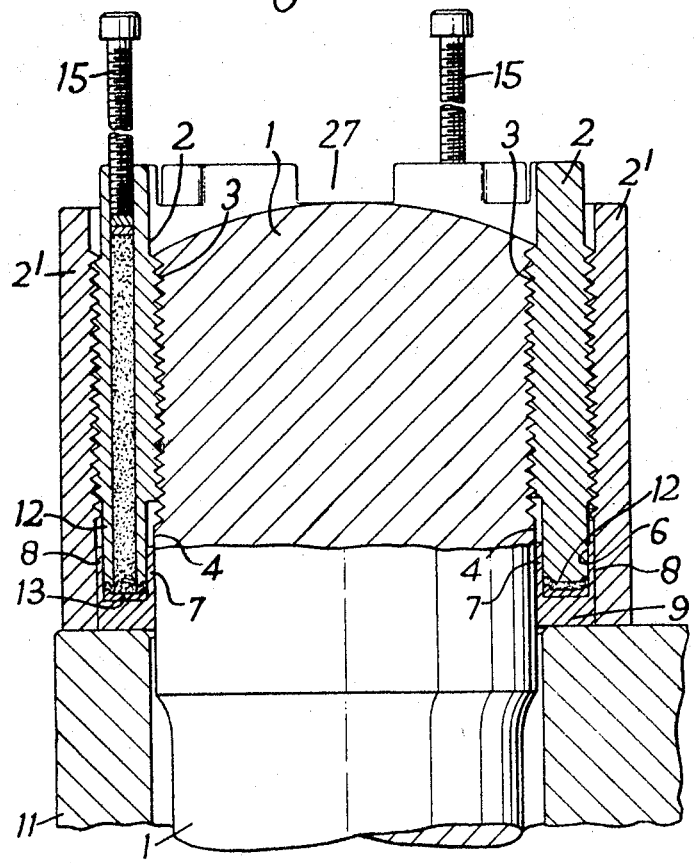
FIGS. 10 and 11 are views in elevation of two further alternative constructions embodying main and auxiliary nuts.

FIG. 10 illustrates a construction utilising an inner main nut 2 and an outer secondary nut 2' as in the construction of FIGS. 7, 8 and 9, and in which the pressure chamber 13 is formed by an annular channel in a ring member 9 located between the smooth part of the external surface of the bolt 1 and an unthreaded smooth internal surface provided in the end of the secondary outer nut 2′, and a piston element formed by the reduced lower end of the inner main nut 2. This arrangement enables both inner and outer channel side walls 7 and 8 of small radial thickness to be used since they are supported against transverse pressure components by their surface engagement with the smooth part of the bolt and the smooth part of the interior of the outer secondary nut respectively.

In this example pressure medium is contained in one or more axial passages 14 extending from the outer end of the inner main nut 2 and through the reduced inner end thereof to the pressure chamber 13, pressure being applied by screws 15 in threaded ends of the passages 14 in a manner generally similar to that described with reference to FIGS. 1 and 2.

Preliminary setting of the two nuts 2 and 2′ and final adjustment of the outer secondary nut 2′ after tensioning of the bolt may be carried out in a manner similar to that described with reference to FIGS. 7, 8 and 9.

Figure 11:
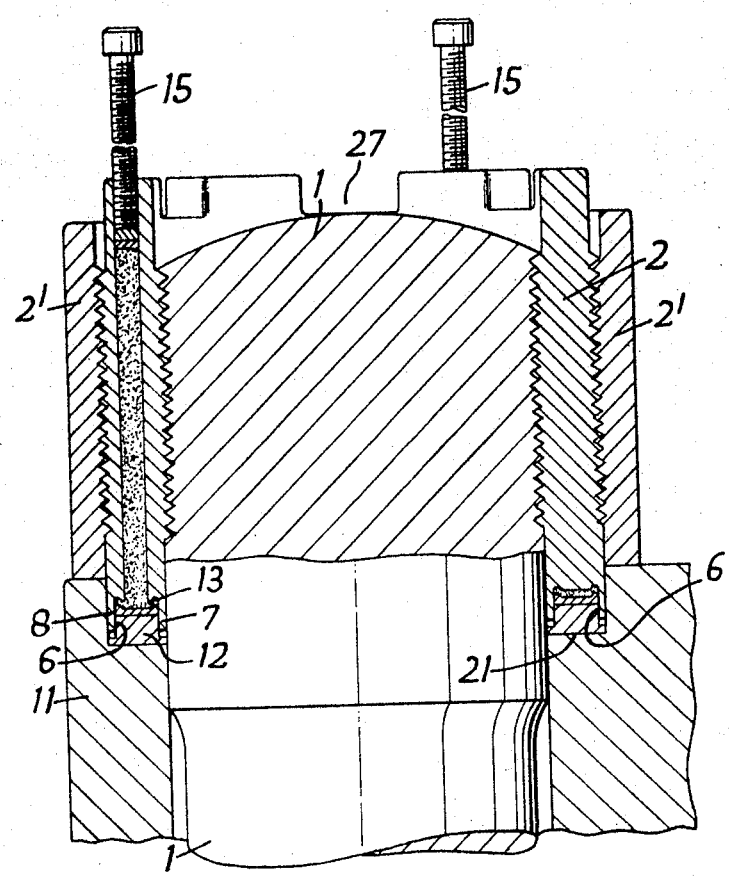

In the construction according to FIG. 11, again making use of inner main and outer secondary nuts 2 and 2′, the pressure chamber 13 is formed by an annular channel 6 in a lower internally and externally smooth end part of the inner main nut 2, and an annular piston element 12 which is a sliding fit within said channel 6.

The internally and externally smooth end part of the inner main nut 2 is a close sliding fit between a smooth external part of the surface of the bolt 1 and a smooth internal circumferential surface of a counterbore 21 at the end of the bolt-receiving aperture in the assembly 11 to be bolted.

Thus, both the inner and outer walls 7 and 8 of the channel 6 of the pressure chamber 13 are supported against transverse pressure components and may be of small radial thickness as shown.

Pressure medium is introduced through axial passages 14 extending through the inner main nut 2 and with the aid of screws 15, and preliminary manipulation of the nuts 2 and 2′ and final manipulation of the nut 2′ may be carried out, all as previously described.

Figure 12:
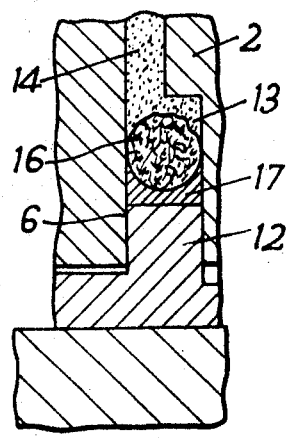
FIGS. 12, 13 and 14 are sectional views on a larger scale showing further details.

FIG. 12 is a view in section of part of a nut 2 in which the pressure chamber 13 contains a mass of a putty-like plastic substantially incompressible particulate material 16 which may be finely divided refractory material in admixture with a liquid binder or a finely divided ceramic material in admixture with a liquid binder with a sealing washer 17 of a yielding material such as nylon, between the mass of material 16 and the piston-like element 12 the surface of the washer engaged by the mass being of concave circular arcuate contour.

The pressure may be applied by means of axially disposed screws such as the previously described screws 15 in axially disposed holes 14 which may contain similar putty-like material or alternatively a liquid or rubber.

Figure 13:
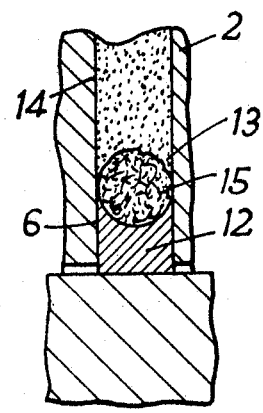

FIG. 13 shows a construction with which a putty-like mass may be used in the pressure chamber 13, the sealing washer in this case being omitted and the surface of the piston-like element 12 engaged by the mass being itself of concave circular arcuate contour.

Figure 14:
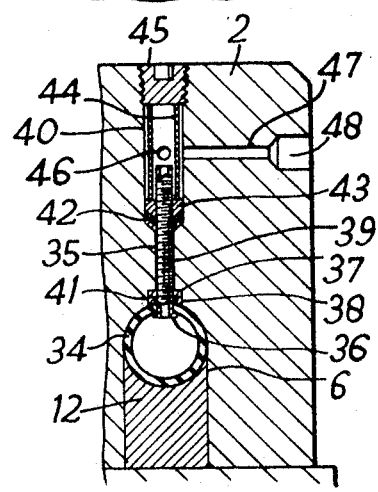

In FIG. 14 there is shown a construction particularly suitable for use with nuts of very great size such as nuts used to force up ships propellers on the tapered ends of propeller shafts and securing the mounted propellers on the shafts.

Here again, the preferred pressure medium is a putty-like plastic substantially incompressible particulate material.

In the construction shown in FIG. 14 the annular channel 6 in the underside of the nut 2 contains a closed tubular ring or tie 34 of natural or synthetic rubber which may be of circular, as shown, or other section, and an approximate fit in the bottom of the recess 6 in the un-stressed condition of the ring 34, and the surface of the piston-like element 12 engaging the ring 34 is of concave arcuate form to make surface engagement with the ring 34 as shown, or alternatively a yielding washer similar to that shown at 17 in FIG. 13 may be interposed.

A metal tube 35 having a shaped head 36 is connected with the hollow ring 34 by passage of the head 36 through a small aperture in the wall of the ring and securing by means of a nut 37 applied over the tube 35 and against one or more shaped washers 38.

The tube 35 is a close fit in an axial bore 39 formed in the nut 2, both ends of the bore 39 being counter-bored as shown at 40 and 41.

The nut 37 and washer 38 are of a size to fill the counter-bore 41 at the inner end of the bore 39 and the free end of the tube 35 extends into the outer end counter-bore 40.

Two or more shaped washers 42 are applied over the free end of the tube 35 and are deformed to provide a pressure seal by means of a coned washer 43 subjected to pressure by means of a distance sleeve 44 disposed with clearance in the interior of the outer counterbore 40 and held by a tapered screwed plug 45 applied on the screw threaded end of the counterbore 40, the plug 45 also serving as a closure for the outer end of the counterbore 40. The distance sleeve 44 is provided with a number of apertures 46 in its wall.

A transverse bore 47 is formed through the nut 2 communicating with the outer end counterbore 40, the outer end of the transverse bore 47 being itself counter-bored and threaded to provide a socket 48 for the connection of the pressure source.

Pressure medium introduced by way of the transverse passage 47 enters the space in the counterbore 40 outside the distance sleeve 44, and thence through the apertures in the wall of the sleeve to the interior of the latter and through the tube 35 into the hollow ring 34 to expand the latter and the closed pressure chamber to tension the bolt.

This construction is specially suitable for use where very high pressures are required to be used, e.g. of 15,000 lbs. per sq. inch or more, since the arrangement described is found to function without leakage of the pressure medium even at such high pressures.

The pressure medium is preferably one of the putty-like substantially incompressible particulate materials, but liquid media such as oil or grease may also be used.

It is preferred to provide two separate connection assemblies as described above with the hollow rubber ring 34 of each nut so that one may serve for the egress of air whilst the hollow ring is being charged with the pressure medium through the other, and for the reception of a pressure gauge after all air has been removed and the operation of tensioning is being carried out.

I claim:

1. A nut and bolt, stud or the like combination, comprising a bolt, stud or the like including a screw-threaded part extending over a part of its length and a smooth-surfaced part adjacent said screw-threaded part of a diameter not less than the maximum diameter of the screw-threaded part;

a nut for retaining engagement with the said screw-threaded part;

an annular part located beneath the said nut with the said annular part and the said nut comprising a pair of parts capable of movement relative to one another in the direction axially of the bolt, stud or the like;

and a closed annular pressure chamber defined by an annular channel with axially directed parallel inner and outer walls in one of the said pair of parts capable of relative movement and a piston-like part on the other of the said pair of parts capable of relative movement and which is a sliding fit in said annular channel, the external surface of the radially inner wall of the said annular channel making continuous surface contact over the entire axial extent of said external surface with the surface of the smooth-surfaced part of the bolt, stud or the like in the assembled and tensioned condition of the nut and bolt, stud or the like.

2. A nut and bolt, stud or like combination as claimed in claim 1 wherein the said annular channel is formed in the lower end of the nut itself and the radially inner wall of said annular channel is of smaller thickness than the radially outer wall of said annular channel.

3. A nut and bolt, stud or like combination as claimed in claim 1 wherein the said annular channel is formed in the said annular part located beneath the said nut and the said annular part is a ring member surrounding and fitting the smooth-surfaced part of the bolt, stud or the like, and the radially inner wall of said annular channel is of smaller thickness than the radially outer wall of said annular channel and the external surface of said ring member coincident with the inner periphery of the said ring member.

4. A nut and bolt, stud or the like combination as claimed in claim 1 wherein the said nut is externally screw-threaded and a secondary nut screwed thereon;

the secondary nut has an internal smooth-surfaced part at its lower end and the said annular channel is formed in the said annular part located beneath the said nut and the said annular part is a ring member surrounding the bolt, stud or the like and the radially external wall of the said annular channel is in continuous surface contact with the internal smooth-surfaced part at the lower end of the secondary nut in the assembled and tensioned condition of the nut and bolt, stud or the like.

5. A bolted assembly including a plurality of nut and bolt, stud or the like combinations as claimed in claim 1 and a member to be clamped, wherein the said annular channel of each nut and bolt, stud or like combination is formed in a ring member surrounding and fitting the smooth-surfaced part of the respective bolt, stud or the like;

and a conduit connected with the annular channels in the ring members of a plurality of said bolts, studs or the like to permit simultaneous application of pressure to the pressure chambers of said plurality of nuts and bolts, studs or the like.

6. A nut and bolt, stud or the like combination as claimed in claim 1 wherein the said pressure chamber defined by the annular channel and the piston-like part contains a mass of a putty-like plastic substantially inelastic and substantially incompressible particulate material.

7. A nut and bolt, stud or the like combination as claimed in claim 1 wherein said annular pressure chamber contains a pressure transmitting medium comprising a finely divided refractory material in admixture with a liquid binder.

8. A nut and bolt, stud or the like combination as claimed in claim 1 wherein said annular pressure chamber contains a pressure transmitting medium comprising a finely divided ceramic material in admixture with a liquid binder.

9. A nut and bolt, stud or the like combination as claimed in claim 1 wherein said annular pressure chamber contains a pressure transmitting medium comprising any one of the materials glaziers putty, or a paste comprising finely divided graphite in a liquid.

10. A bolted assembly including a combination comprising a nut having a circular lower end a bolt, stud or like having a screw-threaded part extending over a part of its length and a smooth-surfaced part adjacent said screw-threaded part of a diameter not less than the maximum diameter of the screw-threaded part; a part to be clamped by said combination having a counterbore at the end of its bolt-receiving aperture therein and receiving the said circular lower end of said nut;

an annular part located beneath the said nut and with the said annular part and the said nut comprising a pair of parts capable of relative movement in the direction axially of the bolt, stud or the like;

and a closed annular pressure chamber defined by an annular channel with axially directed parallel inner and outer walls in one of the said pair of parts capable of relative movement and a piston-like part on the other of said pair of parts capable of relative movement and which is a sliding fit in said annular channel, the external surface of the radially outer wall of the annular channel making continuous surface contact over the entire axial extent of said external surface with the smooth circumferential surface of said counterbore in said part to be clamped.

11. A bolted assembly including a combination comprising a bolt, stud or the like having a screw-threaded part extending over a part of its length and a smooth-surfaced part adjacent said screw-threaded part of a diameter not less than the maximum diameter of the screw-threaded part;

a nut for retaining engagement with the said screw-threaded part of the bolt, stud or the like, said nut being externally circular at its lower end and having an internal smooth-surfaced unthreaded part at its lower end of a diameter similar to that of the smooth-surfaced part of the bolt, stud, or the like and extending below the screw-threaded part of the bolt, stud or the like;

a part clamped by said bolt, stud or the like in said nut, and having a counterbore at the entry end of the bolt, stud or the like-receiving aperture therein, of a diameter similar to that of the externally circular end of the nut and enveloping said externally circular end of the nut;

a closed annular pressure chamber defined by an annular channel with axially directed parallel inner and outer walls formed in the lower end part of the nut; and an annular piston-like part below said nut and fitting said annular channel.

References Cited

UNITED STATES PATENTS

| 2,959,258 | 11/1960 | Hagemann | 85—50 |
| 2,571,265 | 10/1951 | Leufuen | 85—32 |
| 3,059,949 | 10/1962 | Strong | 151—38 |
| 3,154,006 | 10/1964 | Novak | 85—32 |
| 3,130,628 | 4/1964 | Blinn | 85—11 |
| 3,358,772 | 12/1967 | Bunyan | 287—53 |

FOREIGN PATENTS

| 629,284 | 7/1963 | Belgium. |
| 908,360 | 10/1962 | Great Britain. |
| 980,090 | 1/1965 | Great Britain. |

EDWARD C. ALLEN, Primary Examiner

U.S. Cl. X.R.

85—32